Figure 1:
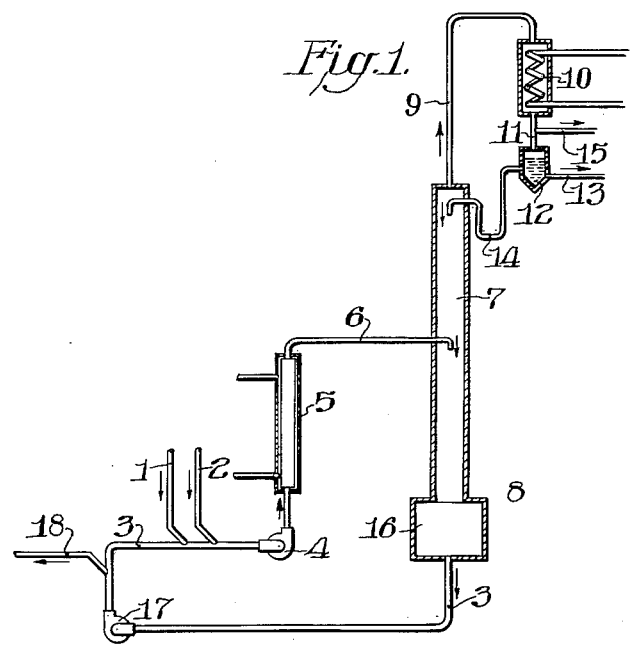

June 6, 1961   K. SENNEWALD ET AL   2,987,451
PROCESS FOR PURIFYING ACRYLONITRILE
Filed Feb. 12, 1958

INVENTORS
Kurt Sennewald
Klaus Born
BY Connolly and Hutz
ATTORNEYS

United States Patent Office 2,987,451
Patented June 6, 1961

2,987,451
PROCESS FOR PURIFYING ACRYLONITRILE
Kurt Sennewald, Knapsack, near Koln, and Klaus Born, Hermulheim, near Koln, Germany, assignors to Knapsack-Griesheim Aktiengesellschaft, Knapsack, near Koln, Germany, a corporation of Germany
Filed Feb. 12, 1958, Ser. No. 714,706
Claims priority, application Germany Feb. 13, 1957
15 Claims. (Cl. 202—57)

The present invention relates to a process for purifying crude acrylonitrile.

In the preparation of acrylonitrile from acetylene and hydrocyanic acid in aqueous cuprous catalyst solutions, a crude product is obtained which still contains lactic acid nitrile or its components hydrocyanic acid and acetaldehyde, as well as cyanbutadiene, methyl vinyl ketone and water. Since even very small quantities of these impurities interfere with the further working up of acrylonitrile into its polymerisation products, numerous attempts have been made to purify acrylonitrile.

Whereas acetaldehyde, cyanbutadiene and lactic acid nitrile can be relatively easily removed from a weakly acid medium by distillation due to the great differences in boiling point, methyl vinyl ketone can be removed only with great difficulty.

The boiling points of acrylonitrile and methyl vinyl ketone are very near each other so that a quantitative separation by distillation can only be achieved with high distillation expenditure and high reflux proportions, which involves high cost of material and gives only poor yields per unit of space and time.

Since acrylonitrile containing methyl vinyl ketone can be considerably more easily polymerised than pure acrylonitrile, the separation of methyl vinyl ketone by distillation entails an increased danger that the desired final product is already polymerised in the distilling column.

To overcome the aforesaid difficulties it has become necessary to find a reaction process for eliminating methyl vinyl ketone from crude acrylonitrile, which reaction process, on the one hand, takes a quantitative course with a concentration of methyl vinyl ketone of even less than 0.5% without any losses in acrylonitrile occurring and which, on the other hand, enables the purified acrylonitrile to be continuously separated by distillation.

The present invention provides a process for purifying crude acrylonitrile in a medium which is not neutral, i.e. is acid or alkaline, with relatively small amounts of at least one aliphatic alcohol (such as glycol, butandiol or glycerol) at a temperature below the boiling point of acrylonitrile and then distilling off the pure acrylonitrile without a previous neutralisation. The time of treatment may vary widely and, in general, range from about ½ hour to about 4 hours and more, while the temperature is kept at about —5° C. to about +78° C.

The amount of alcohol to be added depends on the quantities of impurities contained in the crude acrylonitrile which are to be bound in the distillation sump by reaction with the alcoholic components, for example by an etherification.

For this purpose, the crude acrylonitrile may first be separated from the main portions of acetaldehyde and water as well as from the higher boiling impurities such as cyanbutadiene and lactic acid nitrile, the water content of the crude acrylonitrile being reduced to less than 1% and preferably to less than 0.5%.

The methyl vinyl ketone and the remaining portion of acetaldehyde are then removed by the further treatment according to the invention. The methyl vinyl ketone is mainly converted into a high boiling ether by the addition of an alcoholic group to its double bond. The ether so obtained may then be subject, at least in part, to subsequent reactions. The acrylonitrile thus treated is distilled off under normal pressure or in vacuo through a relatively short column at a reflux ratio of at most 1:1.

As alcoholic components all compounds containing free alcoholic groups may be used. Especially suitable are alcohols which can be easily separated from the acrylonitrile owing to their high boiling point and which, furthermore, react in the desired manner with the impurities, especially with the methyl vinyl ketone. In general, there may be used polyhydric aliphatic alcohols, for example glycol, glycerol, butane-1,3-diol or butane-1,4-diol. Methanol, for example, may, however, also be used.

As acid component an anhydrous organic or inorganic acid, for example sulphuric acid, phosphoric acid or paratoluene sulphonic acid is used. As alkaline component an anhydrous organic or inorganic base, such as ammonia, or an organic amine, such as triethylamine, is used in a catalytic quantity. When the process is carried out in an acid medium, the pH is, in general, adjusted to a value of about 1.5 to about 3.0.

Prior to the final distillation, the crude acrylonitrile is subjected to the reaction of the invention by treatment with a corresponding alcohol, for example in an acid medium, for about ½ to 2 hours, while being heated at a temperature of about +55° C. to about 60° C. Apart from this mode of proceeding at an elevated temperature, which is advantageous in most instances, the process may also be carried out in cases at reduced temperatures, for example between about —5° C. and room temperature, these lower temperatures are associated with a somewhat prolonged treatment. The subsequent distillation is advantageously carried out under reduced pressure.

According to a further feature of the present invention, the alcoholic component may also be used in a greater excess and the liquid distillation residue may then be used for further batches. In this manner, the process may also be carried out in a half-continuous or even completely continuous manner by partly removing the liquid distillation residue intermittently, or continuously from the sump of the distilling column and using it for the treatment of further quantities of crude acrylonitrile while, on the other hand, crude acrylonitrile which has undergone an appropriate pretreatment is intermittently or continuously introduced into the distilling column. This procedure is continued until the purification obtained is no longer satisfactory. Only then is the distillation residue replaced partly or completely by a fresh amount of the alcoholic component, for example fresh glycol.

Going into more detail, the process according to the invention is performed as follows: The acid or base added as a catalyst need not be neutralised before the distillation. The distillation residue consisting of the alcoholic component, which is in most cases used in excess, and the reaction products of the methyl vinyl ketone and the catalyst, is liquid and can be used for further batches without any purification being necessary.

It is surprising that, in addition to methyl vinyl ketone, acetaldehyde is also converted into high boiling point compounds by this reaction, which fact enhances the importance of the process of the invention.

The pure acrylonitrile obtained is of an excellent purity and free from methyl vinyl ketone and acetaldehyde.

The losses in acrylonitrile occurring are extremely small, being below 0.1%, calculated upon the amount of acrylonitrile used. These trifling losses can only be evaluated by determination of the nitrogen content in the distillation residue.

The process of the invention can be easily carried out in a continuous manner. An alcohol in excess, calculated on the content of methyl vinyl ketone and acetaldehyde, is added to the crude acrylonitrile which is then adjusted to the pH values indicated in the following examples and, after about 1 hour of reaction at about +55 to +60° C., continuously distilled under reduced pressure through a column. The temperature of the distilling vessel is kept at about +80° C., which enables the distillation residue to be continuously removed while being essentially free from acrylonitrile and to be mixed with unpurified accrued acrylonitrile in a corresponding ratio. If necessary, the pH value is re-adjusted by adding, for example, concentrated sulphuric acid, and the mixture is returned to the distillation after, for example, ½ hour of reaction.

With a content of methyl vinyl ketone of 0.4–0.6% by weight and a content of acetaldehyde of less than 0.5% by weight, this method requires 0.78% by weight or 0.56% by volume of glycol and 0.05% by volume of concentrated sulphuric acid for the quantitative separation of ketone and aldehyde, the percentages being calculated upon the total amount of crude acrylonitrile used.

A determination of the nitrogen content of the distillation residue shows a loss in acrylonitrile of only 0.08%, calculated upon the acrylonitrile used.

The process of the invention can be applied with similar good results to a crude acrylonitrile which still contains all the impurities. However, the water content of the crude acrylonitrile should advantageously be below 1.0%, although a higher water content does not interfere with the course of the reaction and thus does not affect the process of the invention.

Figure 2:
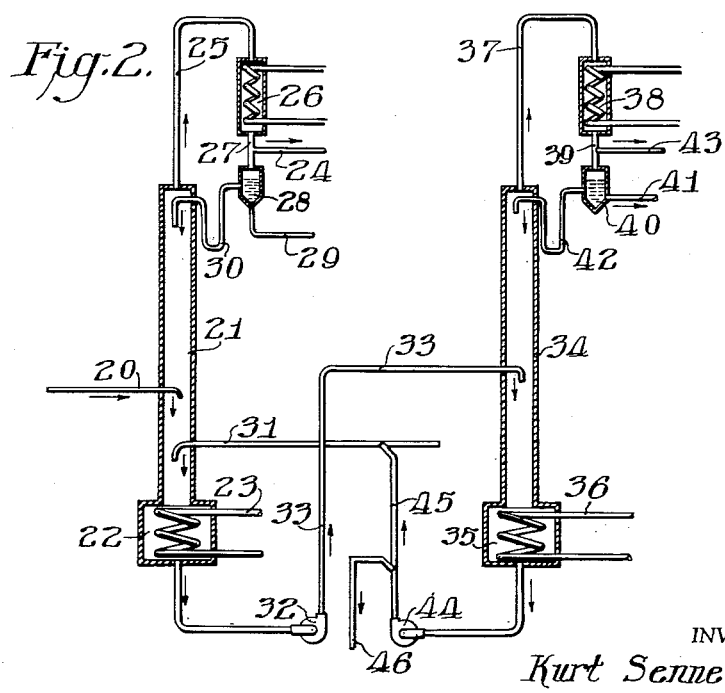

In the accompanying drawing, two flow schemes are schematically represented in FIG. 1 and FIG. 2 for the continuous performance of the process according to the invention. However, the process is not bound to this exemplified representation.

In the method according to the processing scheme represented in FIG. 1, the crude acrylonitrile to be purified is supplied through pipe line 1 while the glycol and also the acid catalyst are supplied through pipe line 2 of a circuit line 3. They are fed by pump 4 through a dwell-time pipe 5, which is heated to a temperature below the boiling point of the acrylonitrile, and also through pipe line 6 into a distillation column 7. By maintaining a still temperature of about 80° C. through heating device 8, the pure acrylonitrile distills off the purification mixture and is fed through the head of the column 7 through pipe line 9 into condenser 10. The condensed acrylonitrile escapes the condenser 10 through pipe line 11 and after feeding it into absorption chamber 12 it is partially extracted from there either through pipe line 13 or fed again into the distillation column 7 through pipe line 14. The distillation of the pure acrylonitrile can take place also in vacuum, the connection of which is provided by the pipe line 15. The sump remaining in retort 16 after separating the pure acrylonitrile from the purification mixture is extracted by the means of pump 17 through the circuit line 3. The sump is either removed through the sump outlet 18 or mixed with the crude acrylonitrile supplied through the pipe line 1 and the mixture is conducted again into the distillation column 7. The loss of glycol resulting during the purification process by conversion with the contaminations can be compensated for, when needed, by adding fresh glycol through the pipe line 2. The occasional occurring loss of the acid catalyst can be compensated for in the same way.

The application of the flow scheme represented in FIG. 2 for the continuous performance of the process according to the invention takes place with special advantage if the crude acrylonitrile to be purified contains more than one percentage by weight of water. For dehydrating the crude acrylonitrile, it is fed through pipe line 20 into distillation column 21 and heated in the retort 22 by a heating device 23—under certain circumstances after connecting a vacuum to vacuum joint 24. In this way, water and acrylonitrile leave the distillation column 21 through the pipe line 25 in gaseous state. The gaseous products are liquefied in condenser 26 and led through pipe line 27 to water separator 28 in which, after formation of two layers, the water as the lower layer is extracted through pipe line 29 while the dehydrated crude acrylonitrile forming as upper layer returns through pipe line 30 into the distillation column 21. The dehydrated crude acrylonitrile accumulating in retort 22 is mixed with glycol supplied in excess through pipe line 31 and also with the acid catalyst. The mixture is fed by pump 32 through pipe line 33 into distillation column 34. After heating the mixture in the retort 35 to a still temperature of about 80° C. by the heating device 36, pure acrylonitrile is expelled from the mixture which arrives in gaseous state through the head of the column and pipe line 37 at the condenser 38. The pure acrylonitrile flowing off the condenser 38 is fed through pipe line 39 into absorption bulb 40 from which the purified product is partially extracted through pipe line 41, while the other part returns through pipe line 42 into the distillation column 34. The distillation of the acrylonitrile can take place also in a vacuum, the connection of which is provided by pipe line 43. The sump remaining in the retort after separating the pure acrylonitrile from the purification mixture is extracted by the means of the pump 44 through the pipe line 45. The sump is either removed through the sump outlet 46, or returned through the pipe line 31 to the distillation column 21, in which a mixing with the crude acrylonitrile supplied anew through the pipe line 20 takes place. The loss of glycol resulting during the purification process by conversion with the contaminations can be compensated by adding fresh glycol through the pipe line 31. The renewal of the acid catalyst can be conducted also in the same way.

The following examples illustrate the invention, but they are not intended to limit it thereto:

*Example 1*

Acrylonitrile free from acetaldehyde and containing 0.63% by weight of methyl vinyl ketone was mixed with 6% by weight of glycol and 0.04% by volume of concentrated $H_2SO_4$ and the whole heated for 1 hour at +55° to 60° C. The solution assumed a yellowish colouration. The pH value of the reaction solution thus treated amounted to about 3. Without previous neutralization, the product was distilled over a short packed column under normal pressure at a reflux ratio of 1:0.5 to 1:1. Taking into account the working contents of the column, the acrylonitrile used was removed quantitatively and was completely free from methyl vinyl ketone.

The distillation residue was liquid and was used for the purification of further amounts of acrylonitrile until the purification became unsatisfactory. This occurred in the present case when the amount of glycol had been reduced to about 0.6–0.7% by weight, calculated upon total amount of crude acrylonitrile used. The distillation residue was then partially or completely replaced by fresh glycol.

*Example 2*

A crude acrylonitrile was used which had previously been freed from the higher boiling impurities such as cyanbutadiene and lactic acid nitrile and from the main portion of water and acetaldehyde. As ascertained by analysis, the crude acrylonitrile thus pretreated still contained about 0.06–0.4% by weight of water, about 0.01–0.36% by weight of acetaldehyde and about 0.2–0.6% by weight of methyl vinyl ketone.

In order to be purified, the crude product was mixed with 10% by weight of glycol and 0.04% by volume of concentrated sulphuric acid and the whole heated for 1 hour at 20 to 25° C. The product was then distilled over a packed column at a pressure of 300 millimeters of mercury and with a reflux ratio of 1:0.5 to 1:1.

The distillation residue was continuously drawn off and again combined with the same amount of crude acrylonitrile which had been previously freed from higher boiling impurities and the main portion of water and acetaldehyde. By the addition of a small quantity of concentrated sulphuric acid the pH was adjusted to a value of 1.5 to 2.0 and the mixture further treated as described above.

The resulting acrylonitrile was obtained in a completely pure form and was free from methyl vinyl ketone and acetaldehyde. The acrylonitrile contained in the crude acrylonitrile was quantitatively recovered by this purification process.

Example 3

The crude acrylonitrile used contained less than 0.5% by weight of water, less than 0.5% by weight of acetaldehyde and 0.4–0.6% by weight of methyl vinyl ketone. The higher boiling impurities of the crude acrylonitrile had previously been removed by a distillation.

20 litres of this crude acrylonitrile were mixed with 1,385 cc. glycol and 8 cc. concentrated sulphuric acid. The solution then had a pH of 2.0–2.5. After a reaction of 1 hour at +55 to +60° C. the product was continuously distilled without previous neutralisation over a packed column at a pressure of 300 millimeters of mercury and with a reflux ratio of 1:0.5 to 1:1. The temperature of the distilling vessel was adjusted to about +80° C., whereby the distillation sump obtained was essentially free from acrylonitrile. The sump was continuously drawn off and added in a corresponding proportion to fresh, crude acrylonitrile. The pH was kept within the range of 2.0–2.5 by the addition of concentrated $H_2SO_4$ and the solution further treated as described above.

In this manner, a total of 245 litres crude acrylonitrile was purified in a continuous process with these 1,385 cc. glycol. The quantity of glycol used thus amounted to 0.56% by volume or 0.78% by weight, the percentages being calculated on the total amount of crude acrylonitrile used. A total of 120 cc. concentrated sulphuric acid was necessary in order to maintain the pH at the desired value. As ascertained by an analytical determination of the $N_2$-content of the distillation residue and calculation of the corresponding amount of acrylonitrile, at most 0.08% of the acrylonitrile used was lost during the process of the invention by reaction and polymerisation.

The acrylonitrile obtained as final product was completely pure.

Example 4

A crude acrylonitrile was used which still contained the higher boiling impurities, such as cyanbutadiene and lactic acid nitrile.

As ascertained by analysis, the product also contained 95.7% by weight acrylonitrile, 0.5% by weight water, 0.4% by weight acetaldehyde and 0.75% by weight methyl vinyl ketone.

To this crude acrylonitrile 5% by weight glycol and 0.08% by volume concentrated sulphuric acid were added. The whole was allowed to stand for 1 hour at 35 to 40° C. and then distilled over a packed column under a pressure of 300 millimetres of mercury at a reflux ratio of 1:0.5 to 1:1.

The acrylonitrile so purified was free of higher boiling impurities, methyl vinyl ketone and acetaldehyde. The distillation residue was used for further batches.

Example 5

Crude acrylonitrile containing 0.3% by weight water and 0.66% by weight methyl vinyl ketone was mixed with 12.5% by weight glycol containing 1.82% by weight anhydrous ammonia. The molar ratio of methyl vinyl ketone and glycol was 1:21.5, and the molar ratio of methyl vinyl ketone and ammonia was 1:1.4. The mixture was heated for 2 hours at +75 to +78° C., and then distilled over a packed column under normal pressure at a reflux ratio of 1:0.5 to 1:1. Taking into account the working contents of the packed column, the acrylonitrile used was recovered quantitatively and in a pure form.

The distillation residue was used for further purifications of acrylonitrile.

Example 6

Crude acrylonitrile containing 0.2% by weight water and 0.64% by weight methyl vinyl ketone was mixed with 15% by weight glycerol and 0.12% by volume concentrated sulphuric acid. The molar ratio of methyl vinyl ketone and glycerol was 1:18.

The glycerol dissolved only partially in the acrylonitrile. The batch was, therefore, thoroughly mixed for 2 hours at +55 to +60° C. in a mixer and then distilled through a packed column at atmospheric pressure with a reflux ratio of 1:0.5 to 1:1. The acrylonitrile used was recovered quantitatively and was free from methyl vinyl ketone. The distillation residue was used for further batches without a previous purification.

Example 7

Crude acrylonitrile containing 0.66% by weight methyl vinyl ketone was mixed with 10% by weight butanediol-1:3 and 0.1% by volume concentrated sulphuric acid and the whole heated for 2 hours at +55 to 60° C. The mixture was then distilled at a pressure of 300 millimetres of mercury through a short column packed with Raschig rings. The acrylonitrile used was recovered quantitatively and was free from methyl vinyl ketone. The distillation residue consisting of an excess of butanediol, sulphuric acid and the reaction product of methyl vinyl ketone with butanediol was used for further batches without a previous purification being necessary.

Example 8

Acrylonitrile containing 0.36% by weight methyl vinyl ketone was mixed with 1% by weight glycol and 0.2% by weight para-toluene sulphonic acid.

The molar ratio of methyl vinyl ketone and glycol was 1:3. After being heated for 2 hours at +55 to +60° C., the solution was distilled through a packed column at a pressure of 300 millimetres of mercury with a reflux ratio of 1:0.5 to 1:1.

The acrylonitrile used was recovered quantitatively and was free from methyl vinyl ketone. The distillation residue was used for the purification of further quantities of acrylonitrile.

Example 9

Acrylonitrile containing 0.68% by weight methyl vinyl ketone was mixed with 5% by weight methanol and 0.08% by volume concentrated sulphuric acid and the whole was heated for 2 hours at +55 to +60° C.

The mixture was distilled through a short packed column at a pressure of 300 millimetres of mercury and with a reflux ratio of 1:0.5 to 1:1.

Towards the end of the distillation only very small quantities of methyl vinyl ketone could be traced in the distillate. This was due to the low stability of the primary reaction product of methanol and methyl vinyl ketone which, in part, again decomposed into the initial components at elevated temperature. In general, it is, therefore, more advantageous to use polyhydric alcohols as in the preceding examples.

Example 10

The crude acrylonitrile used contained 98.3% by weight acrylonitrile, less than 0.1% by weight water and 0.65% by weight methyl vinyl ketone.

After the addition of 0.5% by weight triethylamine and 5% by weight glycol, the whole was heated for 2 hours at +55 to +60° C. The mixture was then distilled at a pressure of 300 millimetres of mercury through a short packed column with a reflux ratio of 1:0.5 to yield a product containing less than 0.1% by weight of methyl vinyl ketone. Losses in acrylonitrile did not occur during this process.

Example 11

A crude acrylonitrile was used which, according to analysis, contained 0.05% by weight acetaldehyde, 0.017% by weight water and 410 milligrams methyl vinyl ketone per 100 cc. crude acrylonitrile. To this crude acrylonitrile 4% by weight glycol was added and the pH was adjusted to 2 by means of para-toluenesulphonic acid, about 0.3% by weight of para-toluenesulphonic acid being necessary. The percentage figures were calculated upon the quantity of crude acrylonitrile. The mixture was then allowed to stand for 3 hours at +16° C.

The mixture was worked up as usual. The distillation residue was used for further batches.

The acrylonitrile so purified contained less than 5 milligrams methyl vinyl ketone per 100 cc. acrylonitrile.

Example 12

To the crude acrylonitrile used in Example 11 4% by weight glycol and 0.3% by weight para-toluenesulphonic acid were added, whereby the pH was adjusted to about 2. The percentage figures were calculated upon the total amount of crude acrylonitrile used.

The mixture was allowed to stand for 3 hours at 0° C. By distillation an acrylonitrile was obtained which contained less than 5 milligrams methyl vinyl ketone per 100 cc. acrylonitrile. When the process was carried out at about −5° C., a similarly good result was obtained.

The crude acrylonitrile used in the preceding examples had previously been stabilised with about 0.1% by weight hydroquinone or a corresponding compound.

We claim:

1. A process for purifying acrylonitrile containing 0.2 to 0.75% methylvinyl ketone which comprises treating the crude acrylonitrile with at least one aliphatic alcohol in a non-neutral medium at a temperature below the boiling point of acrylonitrile and subsequently distilling off the pure acrylonitrile.

2. A process as claimed in claim 1, wherein the treatment is carried out at a temperature within the range of about −5° C. to about +78° C.

3. A process as claimed in claim 2, wherein the treatment is carried out at a temperature within the range of about 55 to 60° C.

4. A process as claimed in claim 1, wherein the treatment is carried out with at least one polyhydric aliphatic alcohol selected from the group consisting of glycol, glycerol, butane-1,3-diol and butane-1,4-diol.

5. A process as claimed in claim 1, wherein the treatment is carried out in an acid medium in the presence of a catalytic amount of at least one acid which is practically anhydrous and which is selected from the group consisting of sulfuric acid, phosphoric acid and para-toluenesulfonic acid.

6. A process as claimed in claim 5, wherein the pH of the acid medium is within the range of about 1.5 and about 3.0.

7. A process as claimed in claim 1, wherein the treatment is carried out in an alkaline medium in the presence of a catalytic amount of at least one anhydrous base selected from the group consisting of ammonia and triethylamine.

8. A process as claimed in claim 1, wherein the distillation is carried out in vacuo.

9. A process for purifying acrylonitrile which comprises treating the crude acrylonitrile which has previously been freed from the main portions of acetaldehyde, water and the high-boiling-point impurities and contains less than about 0.5% by weight of water, less than about 0.5% by weight of acetaldehyde and from about 0.2 to 0.6% by weight of methylvinylketone, the percentages being calculated upon the crude acrylonitrile with at least one aliphatic alcohol in a non-neutral medium at a temperature below the boiling point of the acrylonitrile in order to remove the methylvinylketone and the residual portion of acetaldehyde and subsequently distilling off the pure acrylonitrile without a previous neutralization.

10. A process for purifying acrylonitrile which comprises treating the crude acrylonitrile containing less than about 0.5% by weight of water, less than about 0.5% by weight of acetaldehyde and 0.4% to about 0.75% by weight of methylvinylketone, the percentages being calculated upon the crude acrylonitrile with at least one aliphatic alcohol in a non-neutral medium at a temperature below the boiling point of acrylonitrile in order to remove the methylvinylketone and the acetaldehyde and subsequently distilling off the pure acrylonitrile without a previous neutralization, the alcoholic component being used in a quantity corresponding to about the content of methylvinylketone and acetaldehyde.

11. A process for purifying acrylonitrile which comprises treating the crude acrylonitrile containing less than about 0.5% by weight of water, less than about 0.5% by weight of acetaldehyde and 0.4% to about 0.75% by weight of methylvinylketone, the percentages being calculated upon the crude acrylonitrile with at least one aliphatic alcohol in a non-neutral, medium at a temperature below the boiling point of acrylonitrile in order to remove the methylvinylketone and the acetaldehyde and subsequently distilling off the pure acrylonitrile without a previous neutralization, the alcoholic component being used in excess and the liquid distillation residue being used for the purification of further amounts of crude acrylonitrile.

12. A process as claimed in claim 11, wherein the process is carried out in a manner which is semi-continuous in that part of the liquid distillation residue is intermittently drawn off from the sump of the distillation column and used for the treatment of further quantities of crude acrylonitrile, while crude acrylonitrile which has undergone an appropriate pretreatment is intermittently introduced into the distillation.

13. A process as claimed in claim 11, wherein the process is carried out in a manner which is continuous in that the liquid distillation residue is continuously drawn off from the sump of the distillation column and used for the treatment of further quantities of crude acrylonitrile, while crude acrylonitrile which has undergone an appropriate pretreatment is continuously introduced into the distillation.

14. A process for purification of methylvinyl ketone contaminated acrylonitrile which comprises treating the crude acrylonitrile with at least one aliphatic alcohol in a non-neutral medium at a temperature below the boiling point of acrylonitrile and subsequently distilling off the pure acrylonitrile.

15. A process for purification of methylvinyl ketone contaminated acrylonitrile containing up to about 0.75% by weight of methylvinyl ketone which comprises treating the crude acrylonitrile with at least one aliphatic alcohol in a nonneutral medium at a temperature below the boiling point of acrylonitrile, and subsequently distilling off the pure acrylonitrile.

References Cited in the file of this patent

UNITED STATES PATENTS

| | | |
|---|---|---|
| 2,217,167 | Halbig et al. | Oct. 8, 1940 |
| 2,401,772 | Ralston et al. | June 11, 1946 |
| 2,784,217 | Maute | Mar. 5, 1957 |